United States Patent [19]

Rochester, Jr. et al.

[11] Patent Number: 5,621,735

[45] Date of Patent: Apr. 15, 1997

[54] ADAPTIVE TIME-DIVISION MULTIPLEXING COMMUNICATIONS PROTOCOL METHOD AND SYSTEM

[75] Inventors: Virgil M. Rochester, Jr., Las Vegas, Nev.; Ariel M. Hunt, Vista, Calif.; Charles S. Jonson; John D. Weaver, both of Las Vegas, Nev.

[73] Assignee: Utics Corporation, Las Vegas, Nev.

[21] Appl. No.: 608,131

[22] Filed: Feb. 28, 1996

Related U.S. Application Data

[63] Continuation of Ser. No. 341,015, Nov. 17, 1994, abandoned, which is a continuation of Ser. No. 930,576, Aug. 13, 1992, abandoned.

[51] Int. Cl.⁶ .......................................................... H04J 3/16
[52] U.S. Cl. .............................................. 370/346; 370/349
[58] Field of Search ........................... 370/95.1, 95.2, 370/95.3, 60, 94.1, 94.2, 110.1, 85.6, 85.8; 340/825.08, 825.5, 825.51, 825.52; 379/91, 106

[56] References Cited

U.S. PATENT DOCUMENTS

| | | | |
|---|---|---|---|
| 4,809,268 | 2/1989 | Tejima et al. | 370/95.2 |
| 4,940,974 | 7/1990 | Sojka | 370/95.2 |
| 5,103,445 | 4/1992 | Ostlund | 370/95.2 |
| 5,297,144 | 3/1994 | Gilbert et al. | 370/95.2 |

*Primary Examiner*—Douglas W. Olms
*Assistant Examiner*—Ajit Patel
*Attorney, Agent, or Firm*—Loeb & Loeb

[57] ABSTRACT

A system and method for an adaptive time-division multiplexing communications protocol for collecting data from remote sensors equipped with RF transceivers using an RF transceiver equipped mobile data collection unit. RF transceivers interfaced to remote sensors actively monitor a predetermined RF transmission frequency to ascertain the presence of a signal transmitted by the mobile unit. All remote units detecting the RF signal listen for a message from the mobile unit requesting transmission of their unique identifier, i.e., their ID. This message contains the Time Division Base (TDB) specifying the number of time slots allocated for transmission of remote sensor IDs to the mobile unit. Using the TDB, each remote sensor randomly selects a time slot and transmits its ID to the mobile unit. Unique IDs of remote sensors received by the mobile unit are used to individually poll each sensor for data packet transmission. Upon receipt of a data packet from a remote sensor, the mobile unit sends an acknowledgment packet indicating its data has been received. Upon receipt of the acknowledgment packet, the sensor is set to a state whereby it will not respond to a request for identifier for a specified period of time.

2 Claims, 9 Drawing Sheets

5,621,735

ADAPTIVE TIME-DIVISION MULTIPLEXING COMMUNICATIONS PROTOCOL METHOD AND SYSTEM

This is a continuation of application Ser. No. 08/341,015 filed on Nov. 17, 1994 now abandoned which is a continuation of application Ser. No. 07/930,576 filed on Aug. 13, 1992 now abandoned.

BACKGROUND OF THE INVENTION

1. Field of the Invention

This invention generally relates to apparatus and methods for collection of data from a number of remote devices or sensors. In particular, embodiments of the invention employ a communications protocol designed to resolve contention and allow for collection of data from a variable number of devices using a mobile data collection platform employing single frequency RF signals.

2. Description of Related Art

The need for a system to provide for automated collection of data from remote sensors has been recognized for many years. Such systems can be used in a variety of contexts, such as for monitoring remotely located sensors from a central station or mobile transmitting and receiving unit, e.g. for monitoring utility commodities such as gas, water, electricity and the like. one such system is described in U.S. Pat. No. 4,614,945 to Brunius, et al. (incorporated herein by reference).

Systems currently in use for these types of applications include telephone, hardwired, and RF based systems. Telephone based systems employ either a dial-in mechanism, whereby a remote sensor dials up a computer system and transfers data, or a dial-out system whereby a central computer dials sensors and initiates data transfer. In either case, dial-in or dial-out, these systems require data collection devices to be connected to a telephone line. This complicates installation due to dependence upon a third party, i.e., the telephone utility company. Current technology provides for detecting whether or not the phone line is in use prior to initiating data transfer. Once the data transfer is in progress, the user is precluded from accessing the line until data transfer has been completed. Interruptions such as a pick-up of a phone during data transfer or activation of the call waiting feature can introduce data errors and necessitate the retransmission of data.

In the case of hardwired systems such as those used for electric meters, existing power lines are used as the communications media for the transfer of data. Such systems typically require the use of communications concentrators to store and forward data and require replacement of existing meter devices. Expensive to install, these systems are also dependent upon the integrity of existing lines. Loss of one or more communications concentrators or a damaged power line can result in total or partial system failure.

RF based systems provide advantages because they are not dependent upon existing telephone or power lines. RF based systems can employ distributed concentrators for collecting, storing, and forwarding data to a centralized facility; or employ an RF equipped mobile data collection platform which collects data from remote sensors along the route of travel. Typical mobile collection platforms send out interrogation signals to RF equipped remote sensors which in turn use RF signals to send back data packets containing their respective ID and data. Fundamental to their successful operation is a method of dealing with the contention introduced by a varying number of RF equipped sensors within range of the platform. Existing RF communications techniques typically employ polling schemes whereby the mobile data collection platform transmits a data packet containing the ID of the sensor which is to be interrogated. Given that the RF transceivers have a limited range, this technique requires that mobile platform follow a specific route wherein identities and sequencing of the remote sensors is known in advance. This approach makes such a system dependent upon vehicle speed, data transmission rate and route (i.e., a specific sequence of devices to be read must be known). Deviations in route or vehicle speed can introduce failures by disrupting the sequencing or timing associated with communications protocols.

Another technique employing a mobile data collection platform is described in U.S. Pat. No. 4,614,945 to Brunius, et al. This patent describes a method for data collection whereby each sensor within broadcast range of the mobile unit sends its identification code and accumulated data a plurality of times by serially spaced transmission bursts. The time interval between successive transmission bursts of different sensors/transponders differs. All sensors respond to a common "wake-up" signal and immediately broadcast their transmission bursts of their identifier and accumulated data back to the mobile unit. This technique does not uniquely poll individual transponders. In order to minimize collision interference between signals of simultaneously transmitting devices, ". . . the transponders change the active time and frequency parameters of their respective RF transmissions." In addition, the frequency for each transponder can also vary as a function of the unique identifier for a given transmission interval. Reference is also made to use of a randomizing function to determine time intervals and transmission frequencies for transponders. This technique is intended to avoid collisions between transmission bursts from the plural transmitting of other transponders by actively varying both the time interval and transmission frequency for each active transponder.

The communications scheme described in the Brunius, et al. patent requires that extreme care be used when installing instrument sets in the field to ensure that two or more transponders operating on the same frequency are not installed within the same broadcast range. It also requires a complex mobile unit with receiver units to match instrument sets that are expected to respond within a given operating range. This immediately suggests problems with overlap of frequencies since the data collection platform is mobile. Such overlap of frequencies can adversely affect the collision avoidance scheme. The complex nature of the scheme and its dependency upon the spatial placement of instrument sets, suggests a complex and expensive installation procedure, in addition to a high cost for system operation and maintenance.

Several communications techniques involving RF communications for the purpose of collecting data from remote sensors using a mobile data collection platform have been developed. However, such techniques typically do not mitigate problems associated with the dynamics of a mobile data collection platform, namely variances in vehicle speed, route, and data transmission rate. Embodiments of the communications protocol described below were specifically developed to utilize the physical dynamics of a mobile RF transceiver communicating with a plurality of stationary RF transceivers operating on the same frequency.

SUMMARY OF THE DISCLOSURE

Embodiments of the present invention relate to a system and method for an adaptive time-division multiplexing communications protocol for collecting data from remote sensors equipped with RF transceivers using an RF transceiver equipped mobile data collection unit. The protocol dynamically adjusts to reduce simultaneous transmissions from remote sensors. RF transceivers interfaced to remote sensors actively monitor a predetermined RF transmission frequency to ascertain the presence of a signal transmitted by the mobile unit.

All remote units detecting the RF signal listen for a message from the mobile unit requesting transmission of their unique identifier, i.e., their ID. This message contains the Time Division Base (TDB) specifying the number of time slots allocated for transmission of remote sensor IDs to the mobile unit. The TDB is varied by the mobile unit to accommodate changes in sensor population or density for the purpose of minimizing two or more sensors responding at the same time, i.e., collision avoidance. Using the TDB, each remote sensor randomly selects a time slot and transmits its ID to the mobile unit.

Unique IDs of remote sensors received by the mobile unit are used to individually poll each sensor for data packet transmission. Upon receipt of a data packet from a remote sensor, the mobile unit sends an acknowledgment packet indicating its data has been received. Upon receipt of the acknowledgment packet, the sensor is set to a state whereby it will not respond to a request for identifier for a specified period of time. After all IDs received by the mobile unit have been processed (i.e., after each remote sensor has been polled), the mobile unit determines the number of time slots to allocate (i.e., the new TDB), and transmits a message packet requesting IDs of remote sensors.

BRIEF DESCRIPTION OF THE DRAWINGS

The detailed description of embodiments of the invention will be made with reference to the accompanying drawings, wherein like numerals designate corresponding parts in the several figures.

DESCRIPTION OF THE PREFERRED EMBODIMENTS

The following detailed description is of the best presently contemplated mode of carrying out the invention. This description is not to be taken in a limiting sense, but is made merely for the purpose of illustrating general principles of embodiments of the invention. The scope of the invention is best defined by the appended claims.

Embodiments of the invention discussed below provide a unique method for communicating information between a variable number of stationary RF equipped devices such as sensors and a central data collection unit, such as a mobile data collection unit or stationary central data collection station.

Embodiments of the invention can be employed in a variety of contexts wherein automated data collection is desired, including, but not limited to, remote sensor monitoring for utility commodities such as gas, water, electricity and the like.

Alternatively, embodiments of the invention can be employed as systems for monitoring remote transponders which send data signals corresponding to preset (rather than sensed) information. Such systems include vehicle location monitoring systems (e.g., which monitor the location of vehicles in accordance with information transmitted from the transponders to a mobile unit carried by the vehicles). Vehicle location monitoring systems can be used with on-board map-location apparatus in the vehicle.

While the discussion below refers to such terms as sensors (referring to sensor/transponder devices) and mobile units, it will be understood that various embodiments of the invention may include transponders for sending preset data signals (instead of sensor/transponders for sending signals corresponding to sensed data) or a stationary central data collection station (instead of mobile units for collecting data).

Figure 1:
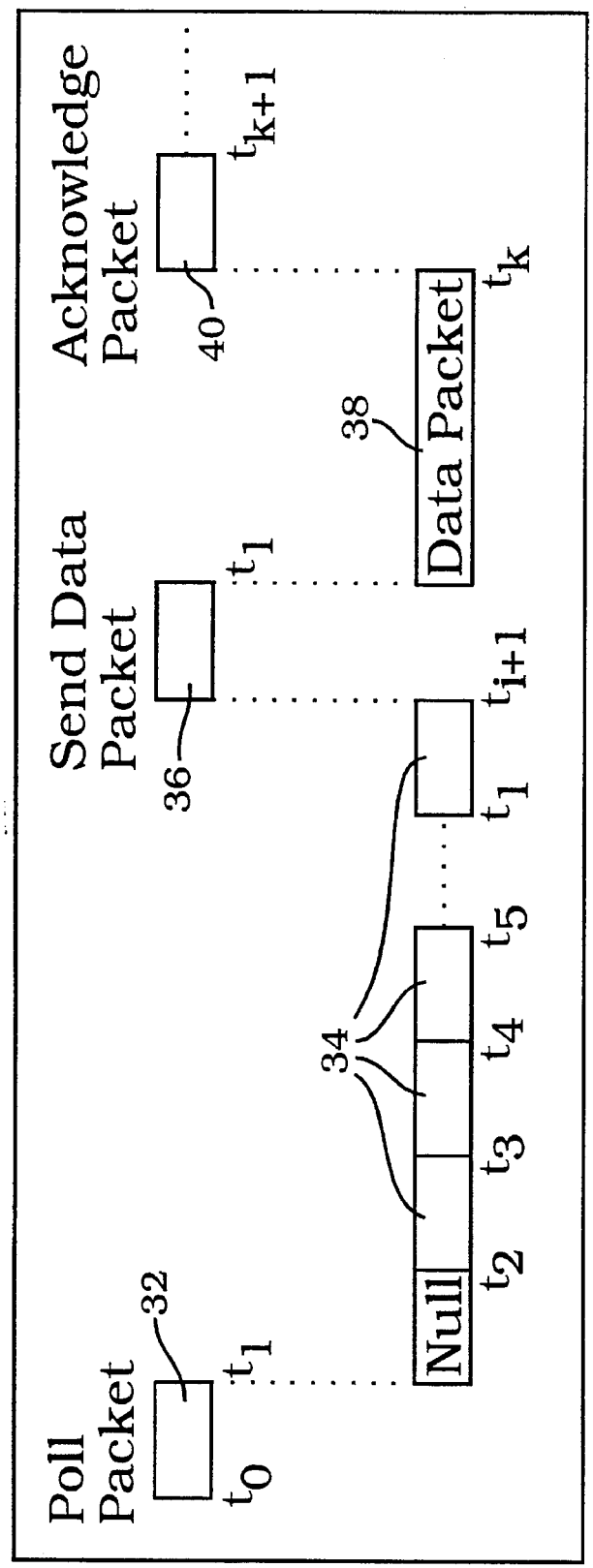
FIG. 1 is a diagramic representation of a communications protocol for data packet timing.
Figure 6:
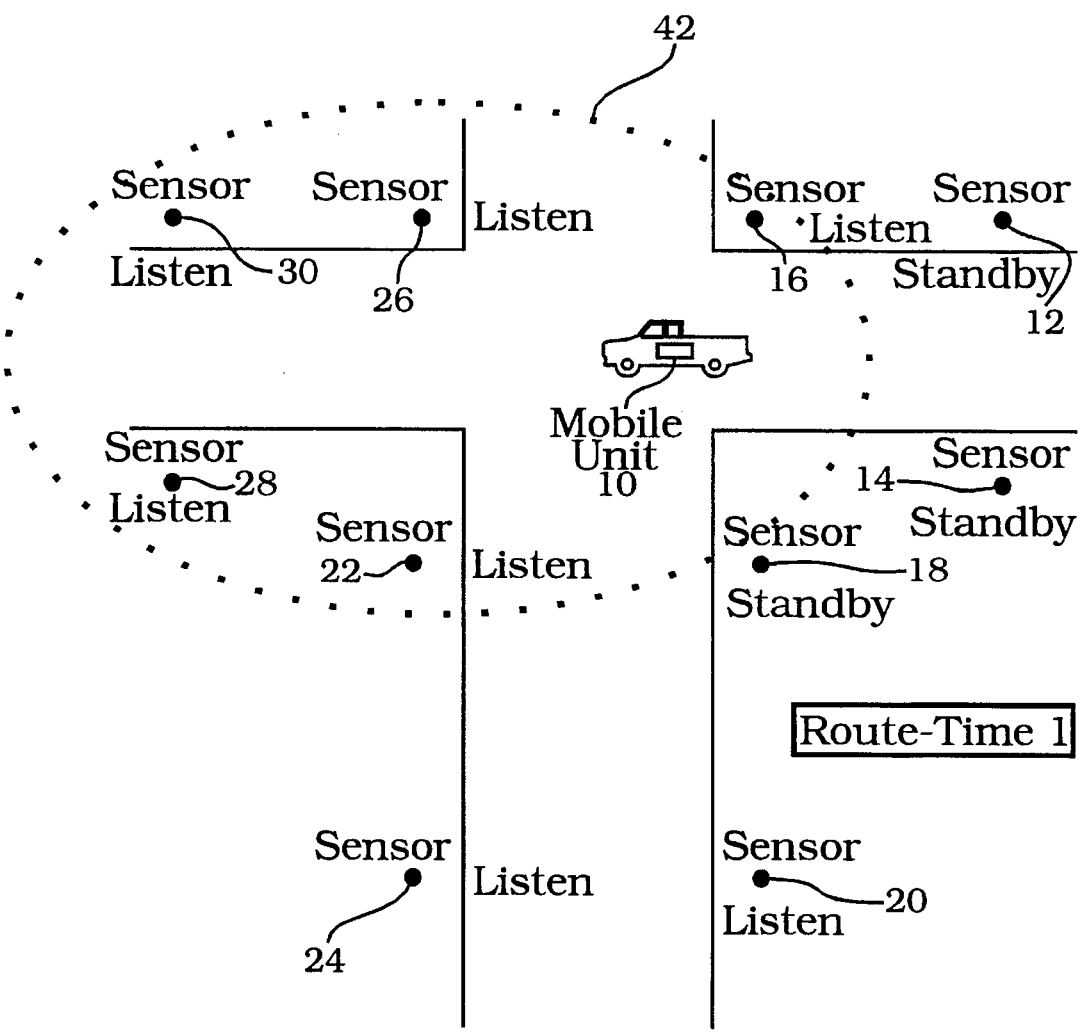
FIGS. 6–9 are diagramic representations of a mobile unit and remote sensors.
Figure 7:
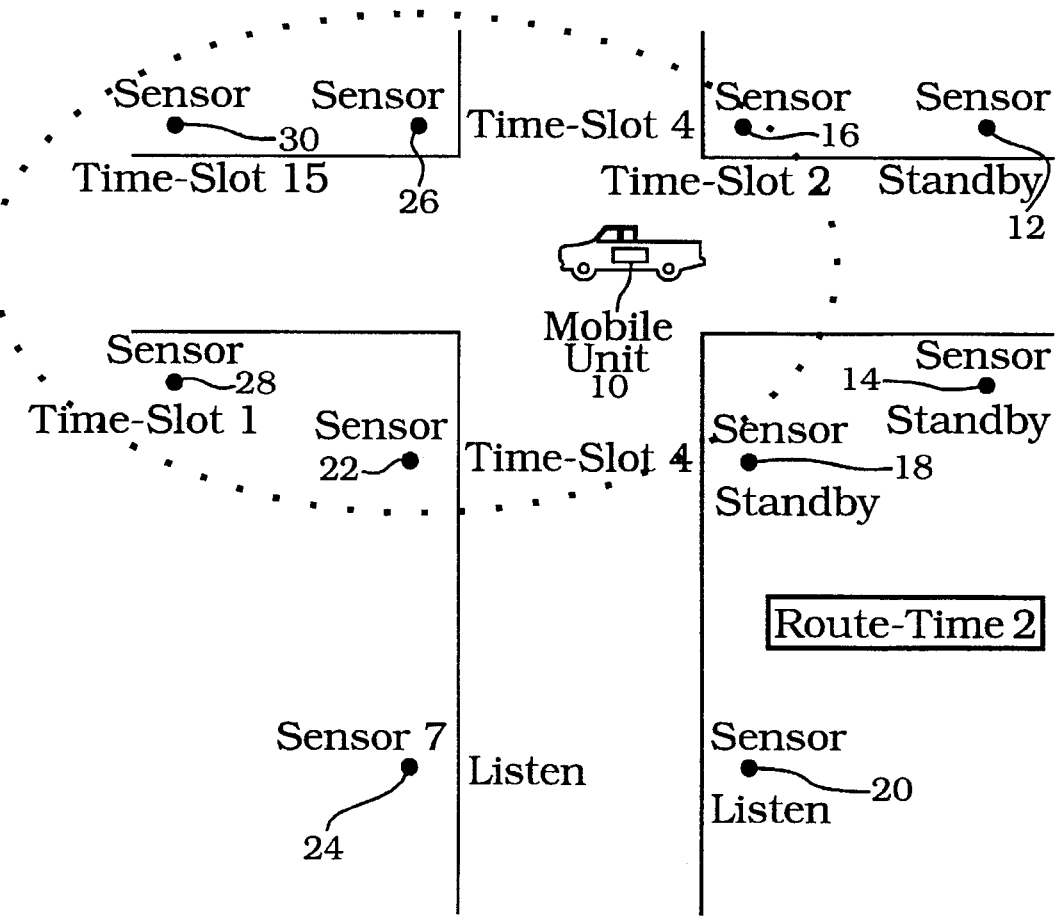

According to the embodiment of FIG. 1, a communications protocol employs both general broadcast and directed polls to obtain information from remote sensor/transponders or preset information transponders along the route of a mobile unit or within the range of a stationary central station. Five information packet signals are used to implement the communications protocol. These information packet signals are described below. For purposes of simplifying the disclosure, the information packet signals are discussed with respect to a system employing a mobile unit 10 and plural sensor/transponders (hereinafter referred to as sensors) 12–30 as shown in FIG. 6.

1. Poll Packet Signal 32

The "Poll Packet signal" contains a packet of information sent from the mobile unit to remote sensors, requesting transmission of sensor identification signals from sensors located within the transmission range of the poll packet signal. The poll packet signal contains a Time Division Base (TDB) specifying the number of time slots allocated for transmission of remote sensor identification codes (IDs) to the mobile unit. The TDB is used by the remote sensors in the transmission of their IDs to the mobile unit.

2. Poll Response Packet Signal 34

The "Poll Response Packet signal" contains a packet of information sent from a sensor to the mobile unit including the sensor ID or address. The time at which this packet is sent by a sensor to the mobile unit is determined. using the TDB obtained from the mobile unit as part of the Poll Packet signal. The TDB specifies the number of time slots allocated for the transmission of Poll Response Packet signals for the current Poll Packet. The time slot for the transmission of a Poll Response Packet signal is randomly selected by the remote sensor. The random selection of time slots by the remote sensors serves to reduce contention among active sensors transmitting their Poll Response Packet signals to the mobile unit for the current Poll Packet.

3. Send Data Packet Signal 36

The "Send Data Packet signal" contains a packet of information sent from the mobile unit to an individual sensor requesting the sensor to transmit its data. The packet contains the ID (or address) of the sensor being interrogated, i.e., the "Send Data Packet signal" is directed to a specific sensor.

4. Data Packet Signal 38

The "Data Packet signal" contains a packet of information sent from an individual sensor to the mobile unit including the data sensed by the sensor. In further embodiments, the "Data Packet signal" contains the sensor ID, data and device status. Device status bits are used to provide information regarding such things as tamper detection, low power detect, device type, number of Poll Response Packets and Data Packets sent since the last Acknowledge Packet, and clock drift.

5. Acknowledge Packet Signal 40

The "Acknowledge Packet signal" contains a packet of information sent from the mobile unit to an individual sensor to acknowledge receipt of a data packet. This packet contains the ID of the remote sensor from which the data packet was received. For further embodiments, it contains the date, time, and Device Wait Time (DWT). The DWT is the amount of time the remote sensor must wait before responding to further Poll Packets transmitted by the mobile unit. The DWT reduces contention in subsequent Poll Packet transmissions by reducing the number of active remote sensors within the mobile unit's transmission range.

Referring to the embodiment shown in FIG. 1, the communications protocol begins with the transmission of a Poll Packet signal 32 by the mobile unit requesting IDs of sensors within the broadcast range. Recognizing that one or more sensors may be within the transmission range of the mobile unit, the communications protocol incorporates a time division multiplexing scheme to minimize contention among sensors transmitting their IDs to the mobile unit. A time division base (TDB) specifying the number of time slots allocated for transmission of sensor IDs is included as part of the Poll Packet. Duration of the time slots is determined by the data transmission rate, byte size, and the data packet size containing the sensor ID. The mobile unit is provided with a data processor for determining the TDB and for performing various other functions described in the flowchart of FIGS. 2–4. The mobile unit also has a transmitter and a receiver for sending and receiving signals.

Upon receipt of a Poll Packet signal from the mobile unit, each sensor synchronizes its respective clock and randomly selects a time slot for transmission of its ID. Each sensor incorporates a free running counter which is asynchronous with respect to other sensors. This counter is used in conjunction with the unique ID to determine the transmission time slot. The free running counter varies in range depending upon the number of bits allocated. Upon receipt of the Poll Packet signal 32 containing the TDB, the data processors of the sensors combine the current value of the free running counter with the unique ID. The resulting value is then divided by the TDB. The remainder of the division specifies the transmission time slot (i.e., 0<=time slot <=TDB). The unique ID of each sensor is used as the base for randomly selecting a transmission time slot. The time slot selected by a sensor also specifies the number of time slots to wait before transmitting its Poll Response Packet. The wait time is relative to the time at which the Poll Packet signal from the mobile unit was received. That is, the real-time clock of each sensor which received a Poll Packet signal is synchronized at the end of the Poll Packet signal transmission and the time slots are calculated by the sensors relative to the end of the Poll Packet signal. The sensors are provided with data processors to perform this calculation and for performing other functions described in FIG. 5. The communications protocol assumes that all remote devices transmit at the same data rate and have a uniform data packet size.

FIG. 1 illustrates the packet signal timing between the mobile unit (10 in FIG. 6) and sensors (16, 22, 26, 28 and 30 in FIG. 6) for the Poll Response Packet transmission. The Poll Packet signal transmission occurs during the time period t0 to t1. A Null transmission time slot, t1 to t2, is allocated to allow sensors sufficient time to determine their respective time slots for ID transmission. The Poll Response Packets are transmitted by the sensors during the time period t2 to ti+1. The mobile unit then begins transmitting Send Data Packets at time ti+1 to those sensors (16, 28 and 30 in FIG. 6) whose IDs were successfully received.

After transmitting the Poll Packet signal 32, requesting sensor IDs, the mobile unit begins listening for and receives Poll Response Packet signals 34. The time duration for the collection of sensor IDs is determined by the TDB, data transmission rate, byte size, and size of the Poll Response Packet. The mobile unit initiates the data collection process at the end of the time period allocated for the transmission of sensor IDs. The data collection process comprises individually polling each sensor for its data. Polling involves the transmission of a Send Data Packet containing the ID of the sensor being interrogated. In further embodiments, the Send Data Packet or Acknowledge Packet signals can be extended to include information used to control the functionality of the devices such as data collection frequency, data groupings, setting of the real-time clock, and data to be transmitted.

Each sensor polled transmits its data using a Data Packet signal 38. Upon receipt of a Data Packet from a sensor, the mobile unit transmits an Acknowledge Packet signal 40 to the sensor informing it that its data has been successfully received. The mobile unit then stores the ID of the sensor in a memory. Upon receipt of the Acknowledge Packet, a sensor is placed into a wait state whereby it will not respond to Poll Packets for a specified period of time. This reduces contention by preventing these sensors from responding to subsequent Poll Packet signals. The time period for non-response could be dynamically adjusted through an algorithm similar to that used for the TDB.

Sensors which do not successfully receive an Acknowledge Packet signal continue to respond to Poll Packets. In order to eliminate duplicate processing of sensor data, all IDs received by the mobile unit are automatically compared against the stored sensor IDs for sensors from which data has been received. If a corresponding ID is found in the stored IDs, an Acknowledge Packet signal 40 is sent to the corresponding sensor. Otherwise the sensor is again polled using the Send Data Packet signal 36 as described above.

Failures to respond to the Send Data Packet message are handled using a time-out scheme. The time-out period is based upon the data transmission rate, byte size, and data packet size.

Data packets not received from sensors by the end of the time-out period result in retransmission of the Send Data Packet signal to those sensors. Although variable, the number of retries is preferably kept to a relatively small number such as two. Time-outs and retries could be dynamically adjusted, but are typically set to a predetermined number for a given data collection and processing regime.

After all IDs have been processed, the mobile unit compares the number of sensor IDs received with the current TDB to determine whether or not the TDB needs to be adjusted (i.e., increased or decreased) for the next Poll Packet. The adjustment process is based upon a utilization range of time slots of 25% to 50%. Utilization of less than 25% results in a reduction and utilization of more than 50% results in an increase. The process also takes into account a predefined minimum and maximum number of ID transmission time slots. Optimum minimum and maximum values can be determined from the average vehicle speed, transmission range, average packet size, data transmission rate, and maximum number of sensors which can occur within the transmission range of the mobile unit. The number by which the TDB is to increase or decrease can be any integral value, provided the result is within the range of the minimum and maximum values. The preferred embodiment using digital circuitry is to increase or decrease the number of transmission time slots by a factor of two.

Figure 2:
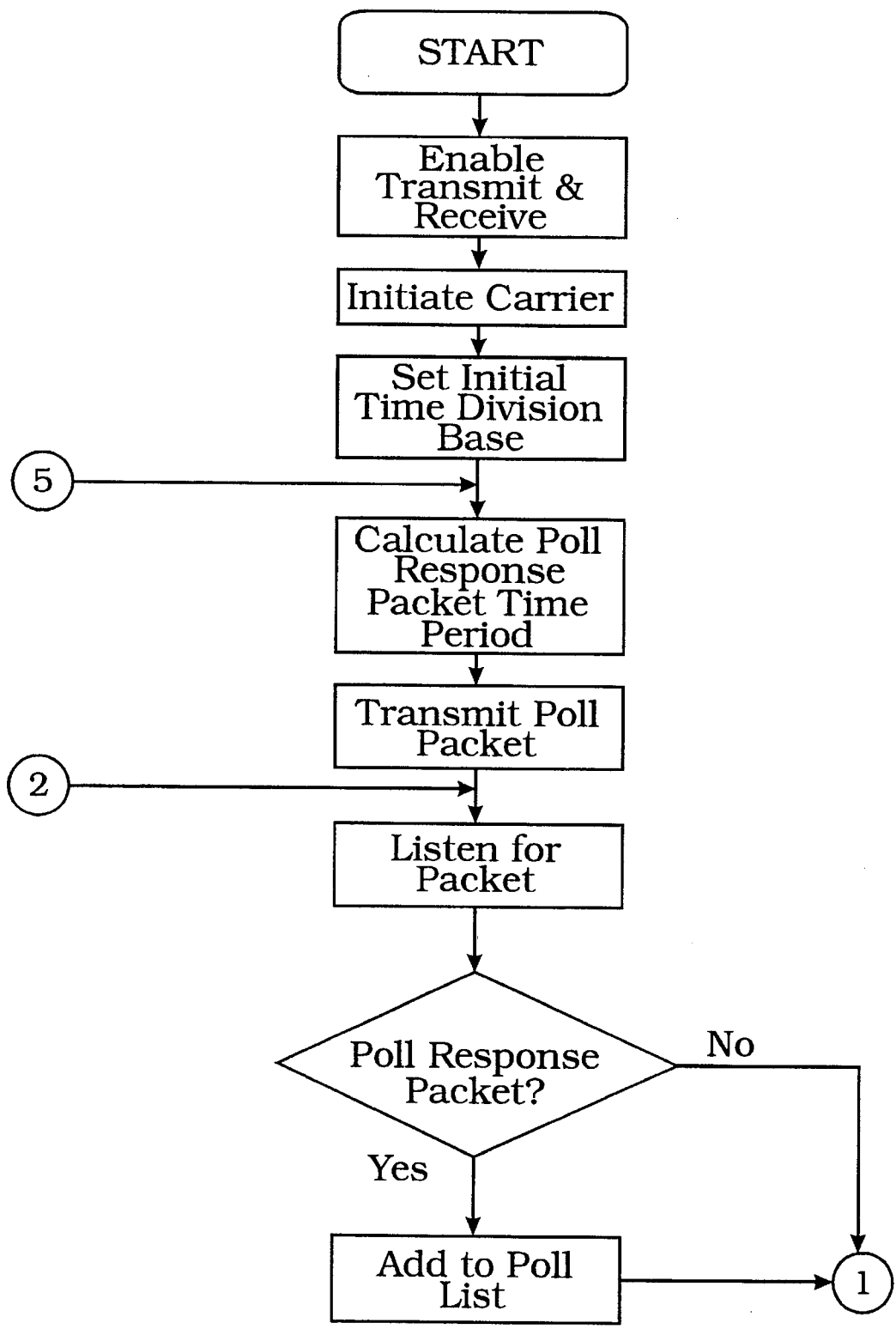
FIGS. 2–4 are flowchart diagrams showing communications logic used by a mobile unit.
Figure 3:
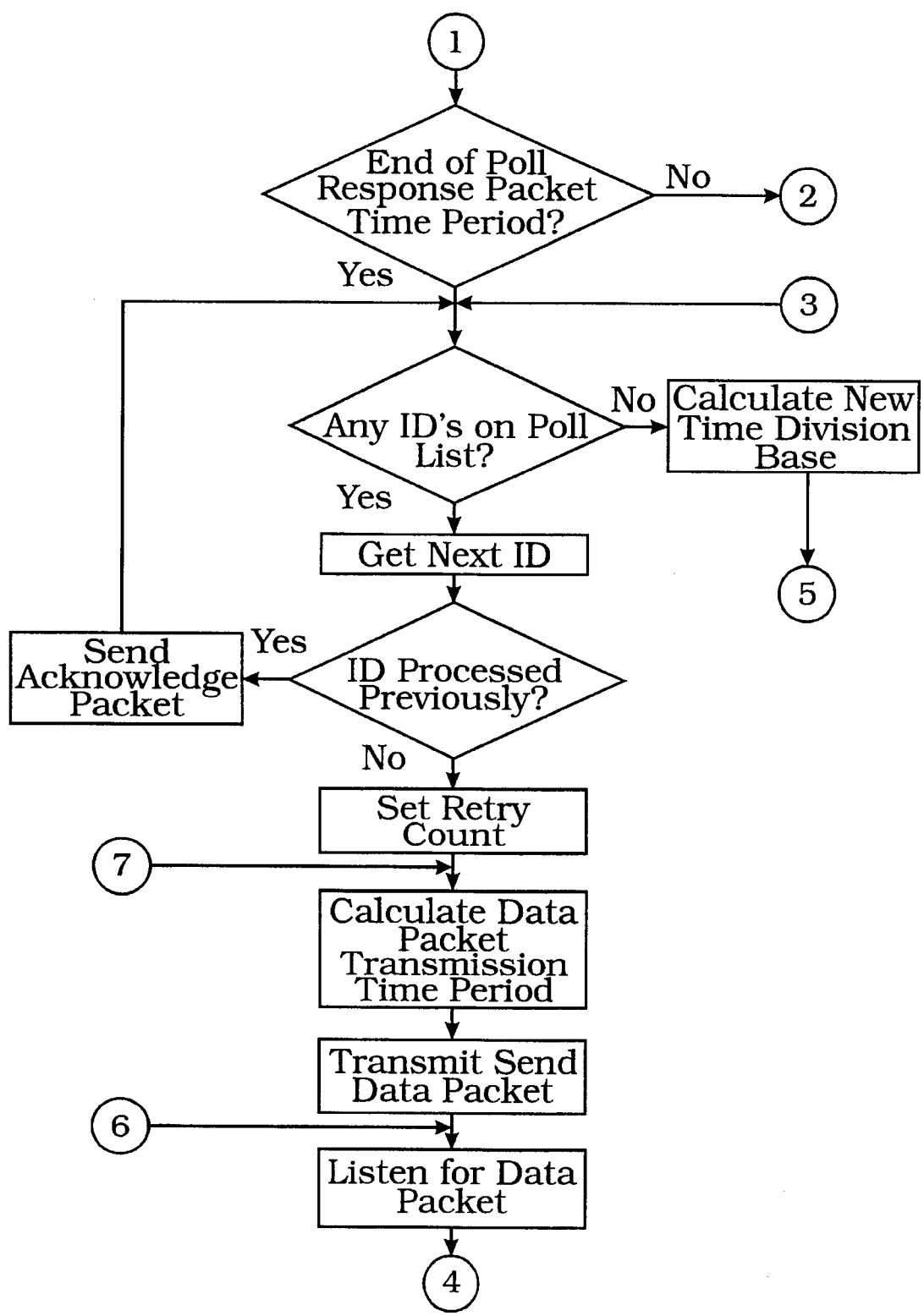
Figure 4:
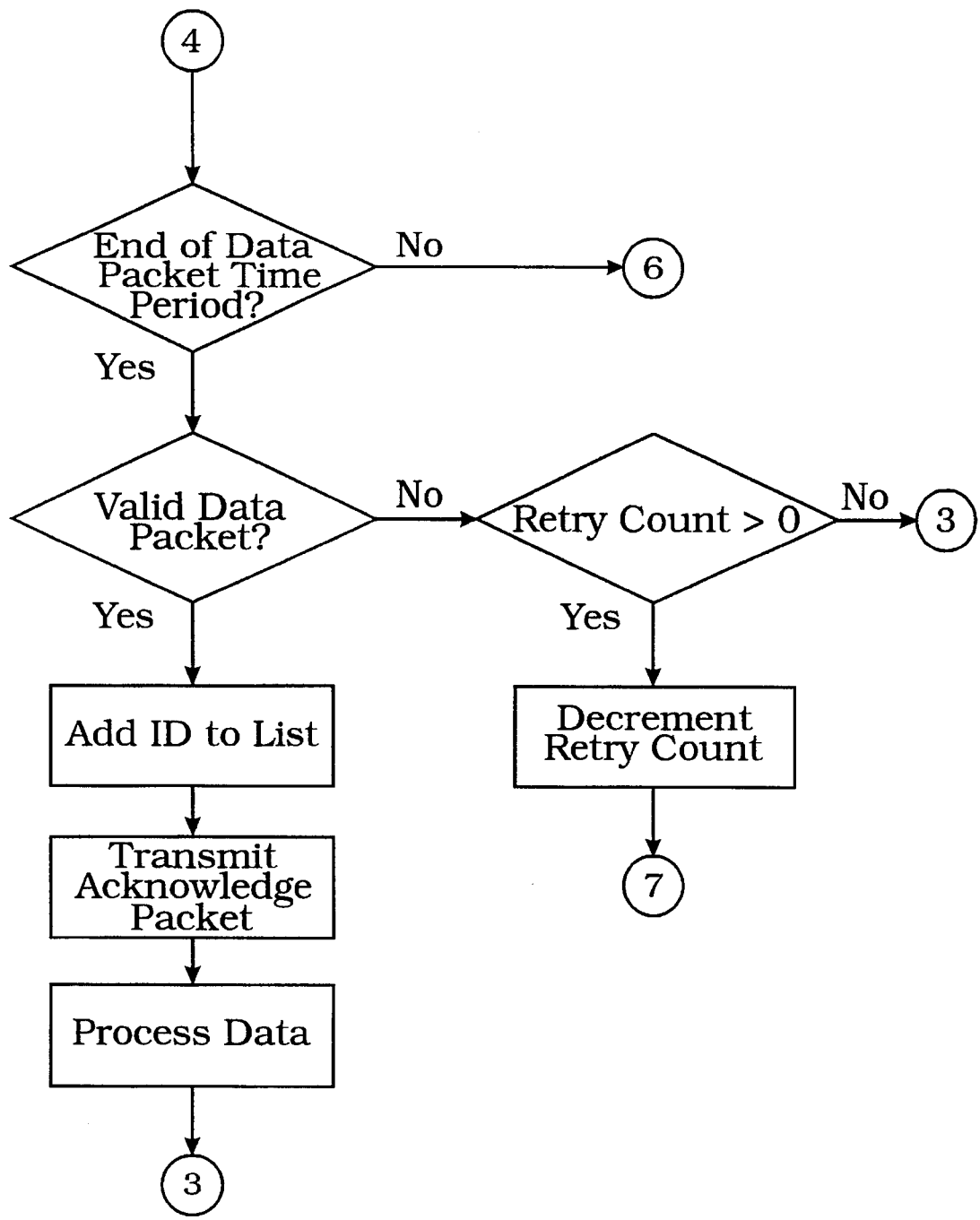
Figure 5:
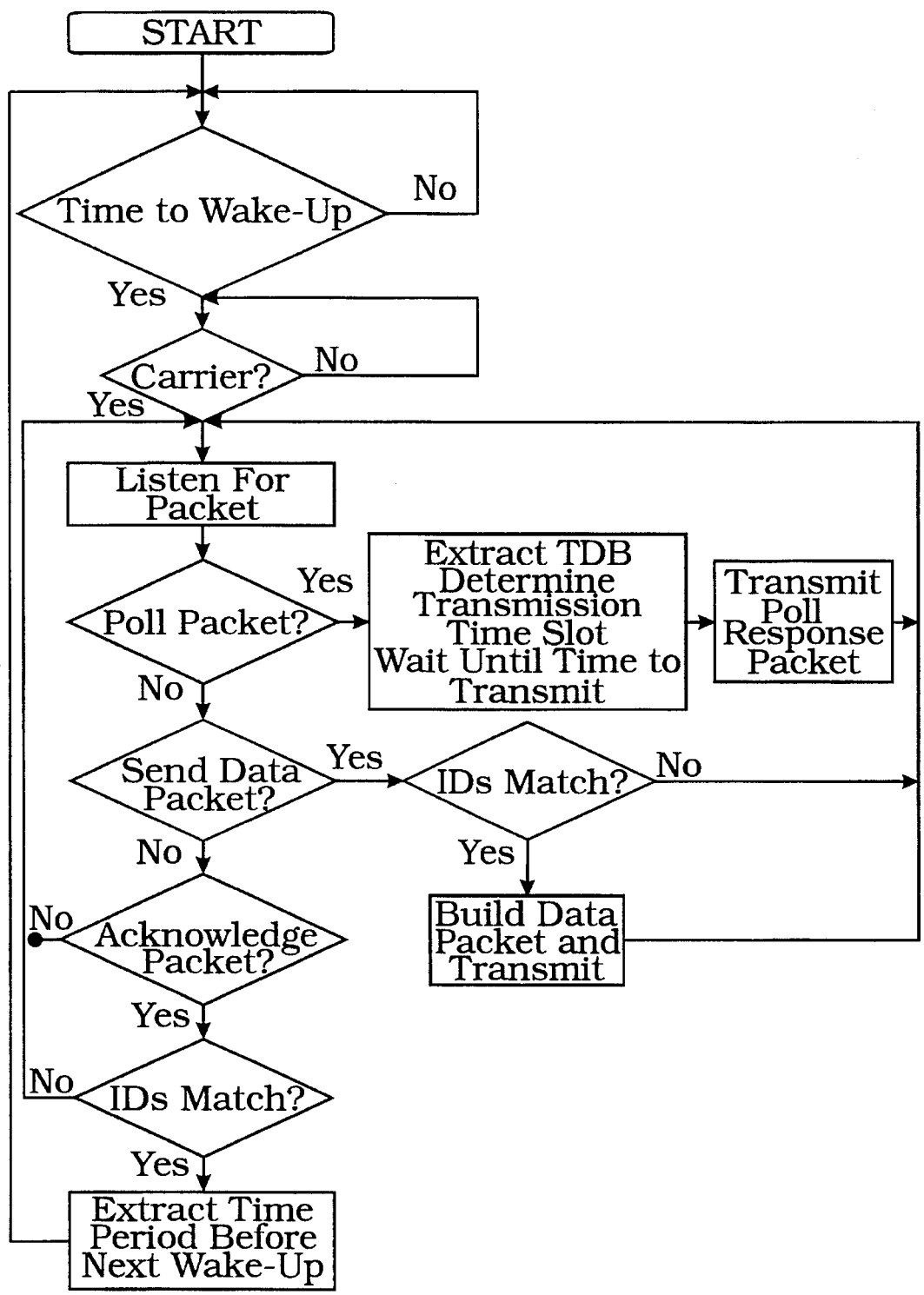
FIG. 5 is a flowchart diagram showing communications logic used by a remote sensor.

FIGS. 2 through 4 depict the logic used by the mobile unit for implementing the communications protocol according to an embodiment of the invention. FIG. 5 is the logic used by the remote sensor for implementing the communications protocol according to an embodiment of the invention. The mobile unit and the sensors are each provided with a data processor, a transmitter and a receiver for performing logic steps described in FIGS. 2–5 and for sending and receiving signals.

FIGS. 6 through 9 provide an illustration of the communications protocol of FIG. 1 as it relates to a mobile data collection unit according to an embodiment of the invention. The ellipse 42 represents the transmission envelop of the mobile unit 10 and the associated sensors 16, 22, 26, 28 and 30 within the broadcast range. In order for the communications protocol to be route independent, it must be able to determine which sensors are within the broadcast range at any point in time. This is achieved by the periodic broadcast of a Poll Packet signal (32 in FIG. 1) requesting the IDs of any sensor within the broadcast range. IDs of sensors (sent by the sensors in Poll Response Packet signals, 34 in FIG. 1) are received by the mobile unit 10 and are then used to poll each sensor for its data (via Send Data Packet signal 36). Upon receipt of a Data Packet signal 38 from a sensor, the mobile unit transmits an Acknowledge Packet signal 40. This causes the sensor to ignore subsequent Poll Packet signals for a specified period of time which reduces contention.

Referring to FIG. 6, at route time 1 the mobile unit 10 transmits a Poll Packet signal. Sensors 16, 22, 26, 28 and 30 are within range of the mobile unit. At route-time 2, FIG. 7, the sensors have determined the time slots for transmission of their respective IDs. Note that sensor 22 and sensor 26 have each selected time slot number 4 for transmission of their IDs. The remaining sensors have selected unique time slots, allowing for successful transmission of their IDs to the mobile unit. Given that the path lengths from sensor 22 and sensor 26 to the mobile unit 10 are equidistant, their Poll Response Packet signals from these sensors will collide such that neither ID will be received. Prior to the next Poll Packet signal the remaining sensors 16, 28 and 30 will be polled for their data and will be set to a standby state.

Figure 8:
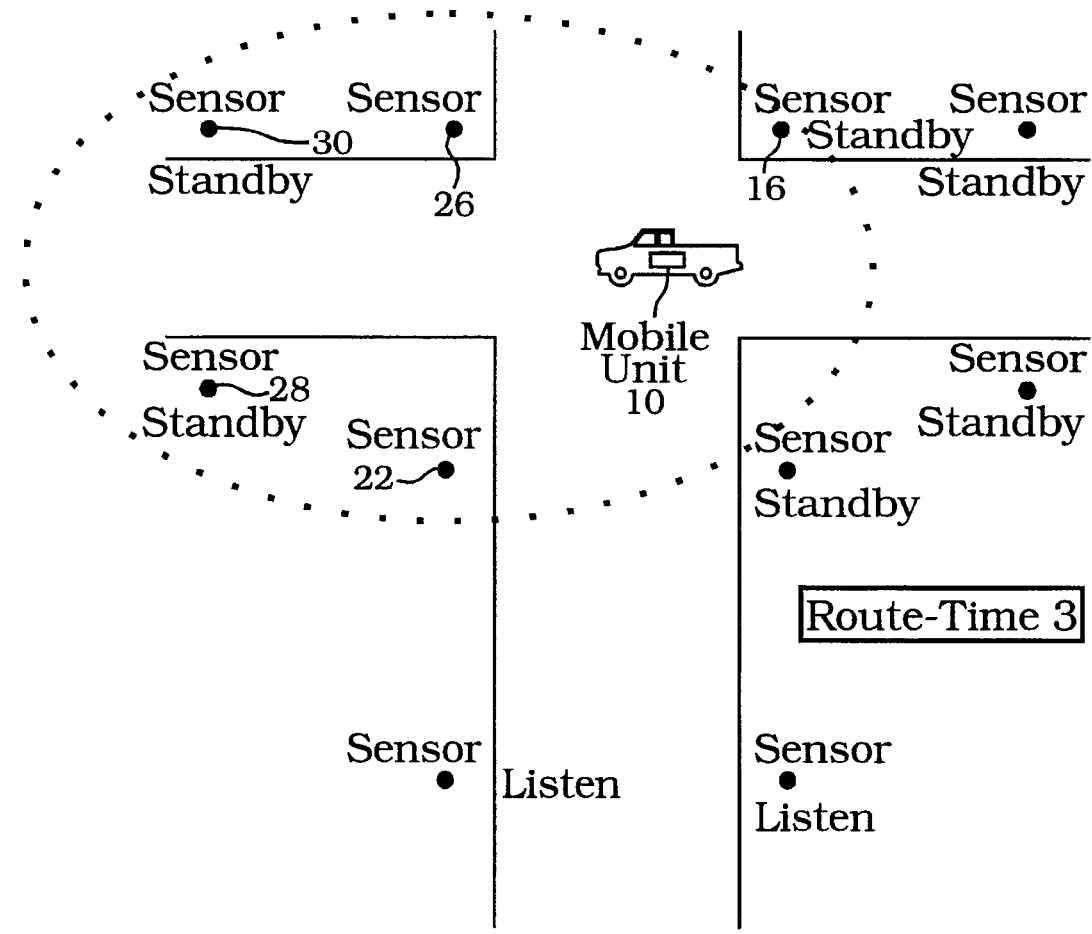
Figure 9:
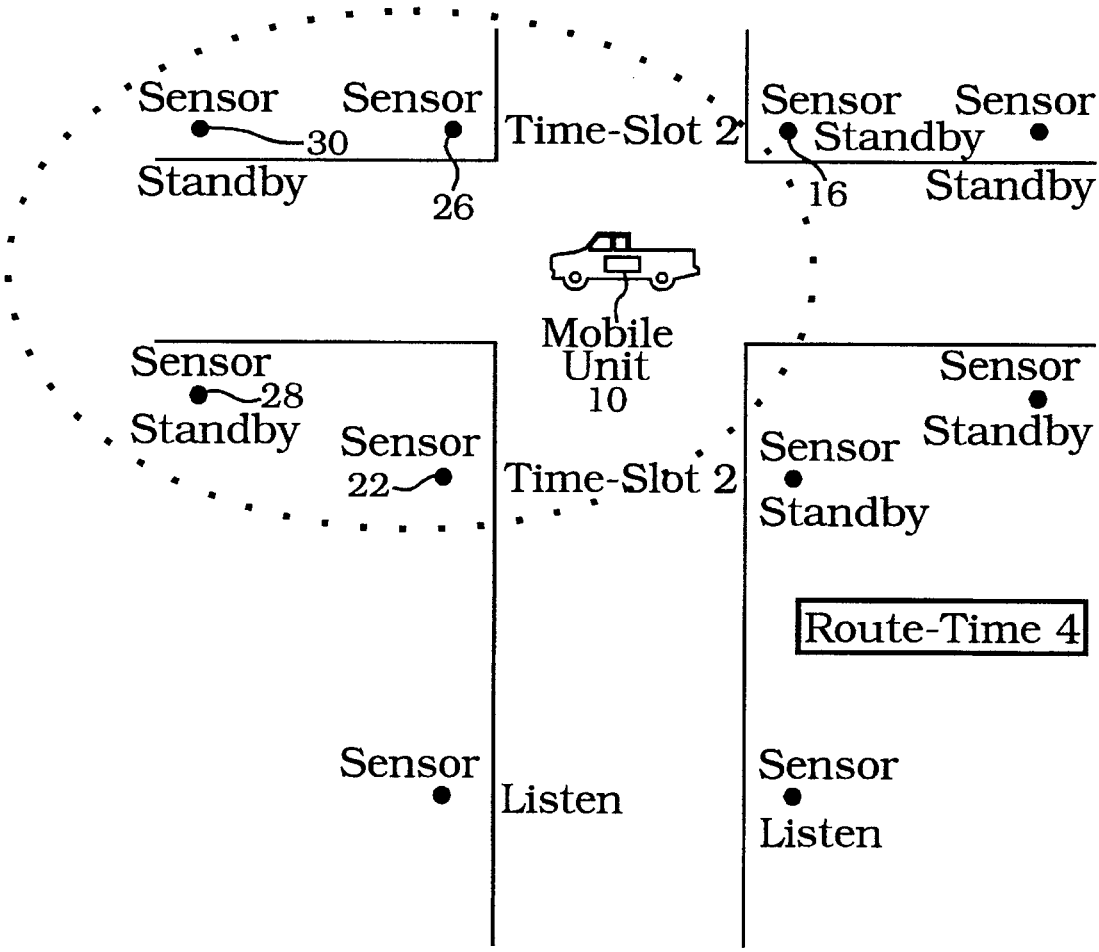

FIG. 8 depicts the mobile unit at route-time 3, transmitting the next Poll Packet signal. It shows sensors 16, 28 and 30 in a standby state and sensors 22 and 26 listening for the Poll Packet signal transmission. At route-time 4, FIG. 9, sensors 22 and 26 have determined time slots for transmission of their IDs. After the successful transmission of their IDs and subsequent transmission of their data to the mobile unit, these sensors will be placed into a standby state. The mobile unit will then proceed along the route transmitting the Poll Packet signal when the next set of sensors comes into the transmission range.

Embodiments of the invention discussed above relate to a system for collecting data from a number of remote transponders, wherein a communications protocol dynamically resolves contention among a plurality of remote devices communicating with a central data collection unit, such as a stationary central station or mobile unit, using a single transmit and a single receive frequency. Contention is resolved using an adaptive time division multiplexing scheme coupled with directed polling.

In addition, embodiments adjust to accommodate real-time changes in the number of remote devices within the range of the central station or mobile unit. Changes are handled by the dynamic adjustment of the Time Division Base (i.e., increasing or decreasing the number of Poll Response Packet time slots) to account for variances in remote device population density. The Acknowledge Packet is used to reduce contention in subsequent Poll Packet cycles by reducing the number of remote devices capable of responding to the Poll Packet.

In embodiments wherein the central data collection unit controller is housed in a mobile unit and utilizes RF signals as a means for communications between the central unit and the remote devices, the system allows for communications with remote devices regardless of location and is not predicated on a predetermined sequencing or routing. Signal types (e.g. microwave signals) other than RF signals may be used in further embodiments. The TDB may be automatically adjusted to accommodate changes in the arrival rate of remote sensors resulting either from changes in vehicle speed or device population. Additionally, adjustments may be made based upon statistics gathered during the current Poll Packet cycle.

In alternate embodiments, the central station is a fixed station and the remote devices communicate with the central controller via a hardwired network connection or using RF or other types of transmissions. Hardwired connectivity can be achieved using such media as coaxial cable, fiber optic cable, and twisted pair wiring.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

We claim:

1. A communication protocol method for communicating data between a central unit and a plurality of remote units, the method comprising the steps of:

transmitting a first signal from said central unit within a transmission range;

receiving the first signal by remote units within the transmission range of the first signal;

transmitting first response signals from remote units which received the first signal, in response to the receipt of the first signal;

receiving first response signals by the central unit;

transmitting a second signal from sad central unit to each remote unit from which one of the first response signals was received;

receiving the second signal by remote units to which the second signal was sent;

transmitting a data signal from each remote unit which received the second signal to said central unit, in response to the receipt of the second signal;

receiving data signals by said central unit;

wherein the second signal includes control data for controlling the remote units, wherein the control data includes data for controlling at least one of the signal frequency of the data signal to be sent by the remote units, the data format and the type of data to be included in the data signal.

2. A communication protocol method for communicating data between a central unit and a plurality of remote units, the method comprising the steps of:

transmitting a first signal from said central unit within a transmission range;

receiving the first signal by remote units within the transmission range of the first signal;

transmitting first response signals from remote units which received the first signal, in response to the receipt of the first signal;

receiving first response signal by the central unit;

transmitting a second signal from said central unit to each remote unit from which one of the first response signals was received;

receiving the second signal by remote units to which the second signal was sent;

transmitting a data signal from each remote unit which received the second signal to said central unit, in response to the receipt of the second signal;

receiving data signals by said central unit;

wherein the second signal includes control data for altering the signal frequency of the data signal to be sent by one of the remote units.

* * * * *